United States Patent [19]

Szabo

[11] 4,043,957

[45] Aug. 23, 1977

[54] STABILIZED VINYL HALIDE RESIN COMPOSITIONS

[75] Inventor: Emery Szabo, Freehold, N.J.

[73] Assignee: Tenneco Chemicals, Inc., Saddle Brook, N.J.

[21] Appl. No.: 680,565

[22] Filed: Apr. 27, 1976

[51] Int. Cl.$^2$ ............................................. C08K 5/58
[52] U.S. Cl. ...................... 260/23 XA; 260/33.64 A; 260/45.75 S; 260/45.95 N; 252/406
[58] Field of Search ................ 260/45.75 S, 45.95 N, 260/23 XA, 33.6 UA; 252/406

[56] References Cited

U.S. PATENT DOCUMENTS

| 2,914,506 | 11/1959 | Mack et al. | 260/45.75 S |
|---|---|---|---|
| 3,063,963 | 11/1962 | Wooten et al. | 260/45.95 N |
| 3,503,924 | 3/1970 | Pollock | 260/45.75 S |
| 3,507,827 | 4/1970 | Pollock | 260/45.75 S |
| 3,632,538 | 1/1972 | Kauder | 260/45.75 |
| 3,890,276 | 6/1975 | Stapter | 260/45.75 |

OTHER PUBLICATIONS

SPE Journal (May 1972), vol. 28, No. 5 pp. 22-26, article by Stapfer et al.

*Primary Examiner*—V. P. Hoke
*Attorney, Agent, or Firm*—Evelyn Berlow

[57] ABSTRACT

Vinyl halide resin compositions that are characterized by excellent early color, clarity, color retention, and processability contain a stabilizer system that comprises a mono-organotin tris(alkyl mercaptide), a mercaptoalcohol, and an organotin sulfide.

10 Claims, No Drawings

STABILIZED VINYL HALIDE RESIN COMPOSITIONS

This invention relates to stabilizer systems for vinyl halide resins and to resinous compositions stabilized therewith. More particularly, it relates to rigid polyvinyl chloride compositions that contain a stabilizer system comprising a monoorganotin tris(alkyl mercaptide), a mercaptoalcohol, and an organotin sulfide.

It is well known that vinyl halide resins undergo undesirable changes when they are exposed to heat and to light and that these changes lead to discoloration and to deterioration of the mechanical properties of the compositions. Since elevated temperatures are required for the processing of these resins and since the resins are exposed to light when they are subsequently used, it is necessary to incorporate in the vinyl halide resin compositions stabilizers that will inhibit or prevent their discoloration when they are exposed to heat and to light.

Organotin mercaptides are among the most effective stabilizers for inhibiting degradation of vinyl halide resins at the high temperature to which they are subjected during processing. Although they provide good long term stability at elevated temperatures, many of the mercaptides impart a yellow color and haze to the resin during the first few minutes of heating, and they cause the development during processing of an unpleasant odor, which remains noticeable in the finished product. While the early yellowing, the haze, and the unpleasant odor do not adversely affect the mechanical properties of the resinous compositions, they severely limit the commercial applications in which the stabilized compositions can be used. Stabilizers that contain organotin mercaptides are disclosed in a number of patents, including U.S. Pat. No. 2,713,585 to Best, 2,731,440 to Stefl et al., 3,398,114 and 3,503,924 to Pollock, and 3,764,571 to Jennings et al.

Like the organotin mercaptides, the organotin sulfides have been limited in their applications as stabilizers for vinyl halide resins because their use results in stabilized products that do not have satisfactory initial color, color hold, and clarity and that may have an objectionable odor. Among the patents in which the use of organotin sulfides in stabilizers for vinyl halide resins is disclosed are U.S. Pat. Nos. 2,267,777 to Yngve, 2,746,946 to Weinberg, 3,021,302 to Frey, and 3,647,748 to Brook et al. U.S. Pat. No. 3,507,827 to Pollock describes the use of mercaptoacids and mercaptoalcohols in stabilizers for polyvinyl chloride. While the stabilizers disclosed in these patents inhibit the deterioration of vinyl halide resin compositions when they are subjected to high temperatures during processing, each has been found to have disadvantages that until now has prevented their coming into general commercial use.

It has now been found that stabilizer systems that impart excellent initial color and clarity and long term heat and light stability to vinyl halide resin compositions result when an organotin mercaptide is combined with an organotin sulfide and a mercaptoalcohol. These stabilizer systems have the further advantage of substantially eliminating the development of objectionable odors during the processing of the compositions as well as residual odors previously encountered in finished products that contain organotin mercaptide or organotin sulfide stabilizers.

The organotin mercaptides that are present in the stabilizer systems of this invention have the structural formula

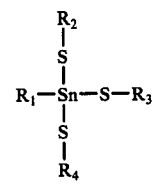

wherein $R_1$, $R_2$, $R_3$, and $R_4$ each represents an alkyl group having 1 to 18 carbon atoms or an alkenyl group having 2 to 18 carbon atoms. Illustrative of these compounds are the following: monomethyltin tris(methyl mercaptide), monoethyltin tris(butyl mercaptide), monopropyltin tris(hexyl mercaptide), monobutyltin tris(decyl mercaptide), monobutyltin tris(dodecyl mercaptide), monohexyltin tris(octadecyl mercaptide), monodecyltin tris(octyl mercaptide), monooctadecyltin tris(hexyl mercaptide), monobutenyltin tris(octadecyl mercaptide), monohexenyltin tris(decenyl mercaptide), monooctenyltin tris(dodecenyl mercaptide), monobutyltin tris(octadecenyl mercaptide), monohexyltin tris(hexenyl mercaptide), monobutyltin di(hexyl mercaptide) (decyl mercaptide), monomethyltin di(octadecyl mercaptide) (hexenyl mercaptide), monobutyltin (butyl mercaptide)(decyl mercaptide)(octenyl mercaptide). The preferred monoorganotin tris mercaptides are those in which $R_1$ represents an alkyl group having 4 to 8 carbon atoms and $R_2$, $R_3$, and $R_4$ each represents an alkyl group having 6 to 18 carbon atoms. Examples of these compounds include monobutyltin tris(octadecyl mercaptide), monobutyltin tris(dodecyl mercaptide), monobutyltin tris(octyl mercaptide), monohexyltin tris(hexyl mercaptide), monohexyltin tris(decyl mercaptide), monooctyltin tris(dodecyl mercaptide), monooctyltin tris(octadecyl mercaptide), monobutyltin (octyl mercaptide)(decyl mercaptide)(octadecyl mercaptide), monooctyltin (hexyl mercaptide)(heptyl mercaptide)(undecyl mercaptide), and the like. A single monoorganotin tris mercaptide or a mixture of two or more of these compounds can be used.

The second component of the novel stabilizer systems is an α- or β-mecaptoalcohol having from 2 to 20 carbon atoms. These compounds have the structural formula

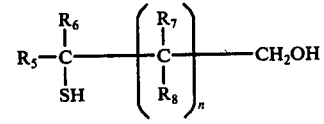

wherein $R_5$, $R_6$, $R_7$, and $R_8$ each represents hydrogen or an aryl, alkyl, alkenyl, or cycloalkyl group and n is 0 or 1. Examples of these mercaptoalcohols include 2-mercaptoethanol, 2-mercapto-1-propanol, 1-mercapto-2-propanol, 3-mercaptohexanol, 3-mercapto-4,5-diethylhexanol, 2-mercapto-4-ethylhexanol, 2-mercaptodecanol, 2-mercapto-2,3-diethyloleylalcohol, 2-mercaptostearyl alcohol, 2-mercaptocyclohexanol, 2-mercaptocycloheptanol, and the like and mixtures thereof. The preferred mercaptoalcohols are the α- and β-mercaptoalcohols that have from 2 to 8 carbon atoms, such as 2-mercaptoethanol, 2-mercapto-1-propanol, 2-mercapto-1-butanol, 1-mercapto-2-butanol, 2-mercapto-1-butanol, 1-mercapto-2-ethyl-hexanol, 2-mercapto-2-octanol, and 3-mercapto-4,5-dimethylhexanol.

The organotin sulfides that are used as a component of the stabilizer systems of this invention have the structural formula

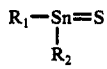

wherein $R_1$ and $R_2$ each represents an alkyl group having 1 to 18 carbon atoms or an alkenyl group having 2 to 18 carbon atoms. Among the useful organotin sulfides are the following: dimethyltin sulfide, diethyltin sulfide, dibutyltin sulfide, dihexyltin sulfide, didecyltin sulfide, dilauryltin sulfide, methylpropyltin sulfide, butyloctyltin sulfide, lauryl stearyltin sulfide, dibutentyltin sulfide, dihexenyltin sulfide, didecenyltin sulfide, butyl hexenyltin sulfide, and the like and mixtures thereof. The preferred organotin sulfides are those in which $R_1$ and $R_2$ each represents an alkyl group having 4 to 8 carbon atoms, such as dibutyltin sulfide, dihexyltin sulfide, dioctyltin sulfide, di-2-ethylhexyltin sulfide, butylhexyltin sulfide, di-2-ethylhexyltin sulfide, butylhexyltin sulfide, butyloctyltin sulfide, and mixtures thereof.

In addition to the organotin mercaptide, mercaptoalcohol, and organotin sulfide, the stabilizer systems also contain an inert organic diluent with which the other components are miscible. Suitable diluents include alkyl esters of aliphatic monocarboxylic acids, such as propyl oleate, butyl oleate, benzyl oleate, octyl oleate, propyl myristate, octyl myristate, hexyl palmitate, propyl stearate, butyl stearate, and octyl stearate, and hydrocarbons, such as benzene, toluene, xylene, hexane, octane, decane, dodecane, 2,2,5-trimethylhexane, cyclopentane, cyclohexane, and petroleum fractions that are mixtures of hydrocarbons, such as mineral oil, VMP naphtha, and mineral spirits.

The stabilizer systems of this invention generally contain from 15 to 75 percent by weight of at least one of the aforementioned organotin mecaptides, 1 to 25 percent by weight of at least one mercaptoalcohol, 3 to 15 percent by weight of an organotin sulfide, and 10 to 80 percent by weight of an inert organic diluent. Particularly good results have been obtained when the stabilizer system contained 30 to 50 percent by weight of an organotin mercaptide, 5 to 10 percent by weight of a mercaptoalcohol, 5 to 10 percent by weight of an organotin sulfide, and 30 to 50 percent by weight of an inert organic diluent.

Only a small amount of the stabilizer system need be present in the stabilized vinyl halide resin compositions of this invention. As little as 0.2 percent of the stabilizer system, based on the weight of the vinyl halide resin, will ring about an appreciable improvement in the early color and the color hold of the compositions. Five percent or more of the stabilizer systems can be used, but these larger amounts generally do not provide further improvement in the properties of the resinous compositions and for this reason are not ordinarily used. In most cases, from 0.3 to 3 percent of the stabilizer system, based on the weight of the vinyl halide resin, gives most advantageous results.

The stabilizer systems of this invention are of particular value in the stabilization of rigid polyvinyl chloride compositions, that is, compositions that are formulated to withstand temperatures of at least 175° C., for example, the pigmented compositions used in the production of pipe. The novel stabilizer systems can also be used in plasticized vinyl halide resin compositions of conventional formulation where high softening point is not a requisite. The vinyl halide resins that may be employed in such compositions include both vinyl halide homopolymers, such as polyvinyl chloride, polyvinyl bromine, and polyvinylidene chloride, and copolymers formed by the polymerization of a vinyl halide with up to about 30 percent of a comonomer, such as vinyl acetate, vinyl propionate, vinylidene chloride, styrene, ethylene, propylene, methyl methacrylate, acrylic acid, and the like. The invention is also applicable to mixtures containing a major proportion of a vinyl halide resin and a minor proportion of another synthetic resin, such as chlorinated polyethylene, polyacrylate resins, polymethacrylate esters, polyacrylonitrile, and terpolymers of acrylonitrile, butadiene, and styrene. Any of the well-known plasticizers for vinyl resins, such as dioctyl phthalate, dibutyl sebacate, tricresyl phosphate, and octyl diphenyl phosphate, can be used.

In addition to the aforementioned ingredients, the stabilized resinous compositions may contain other resin additives, such as pigments, dyes, processing aids, impact modifiers, extenders, and lubricants, in the amounts ordinarily employed for the purposes indicated.

The stabilized vinyl halide resin compositions may be prepared by any suitable and convenient procedure. For example, the ingredients can be dry blended with conventional mixers, such as the Henschel blender, blended on a two or three roll steam-heated mill, or blended by tumbling. The resulting compositions may be further processed by such methods as injection molding, extrusion, blow molding, and calendering.

The invention is further illustrated by the following examples. In these examples all parts are parts by weight, and all percentages are percentages by weight.

EXAMPLE 1

Single screw pipe compositions were prepared by mixing the following materials together in a Henschel mixer at 3000 rpm at temperatures between 60° C. and 90° C. until a uniform composition was obtained:

|  | Parts |
| --- | --- |
| Polyvinyl chloride (Tenneco 225) | 100 |
| Impact Modifier - MBS Type | 3.00 |
| Calcium stearate | 1.00 |
| Titanium dioxide | 2.00 |
| Petrolatum | 0.084 |
| Stabilizer | 0.60 |

The properties of the compositions during processing were determined by working 62.5 grams of each of the compositions in a Brabender Plasticorder No. 3 using a No. 6 roller head, a bowl temperature of 178° C., a rotor speed of 60 rpm, and a suppression weight of 5 kg. (fusion test only) until degradation had taken place.

The stabilizers used and the properties of the stabilized compositions are set forth in Tables I and II. In the results of the Dynamic Brabender Heat Stability Tests reported in Table I and Table III, a rating of 1–2 indicates white; 3–4, off-white; 5–6, slight yellow; 7–8, yellow or light brown; 9, dark yellow or brown; and 10, gray or black.

For comparative purposes five organotin stabilizers that are widely used commercially were included in the tests.

Table I

| Stabilizer Components (%) | Example No. 1A | Example No. 1B | Comparative Stabilizer No. A (1) | B (2) | C (3) | D (4) | E (5) |
|---|---|---|---|---|---|---|---|
| Dibutyltin sulfide | 7.8 | 7.0 | — | — | — | — | — |
| Beta Mercaptoethanol | 6.3 | 6.0 | — | — | — | — | — |
| Monobutyltin tris(dodecyl mercaptide) | 47.6 | 43.0 | — | — | — | — | — |
| Butyl oleate | 38.3 | 44.0 | — | — | — | — | — |
| Metal Content (%) | | | | | | | |
| Sn | 10.5 | 9.4 | — | — | — | — | — |
| S | 9.4 | 8.6 | — | — | — | — | — |
| Dynamic Brabender Heat Stability (Color after indicated time at 178° C.) | | | | | | | |
| 1 Min. | 1 | 1 | 1 | 1 | 1 | 1 | 1 |
| 2 | 1 | 1 | 4 | 2 | 2 | 2 | 2 |
| 3 | 2 | 2 | 5 | 2 | 3 | 3 | 3 |
| 4 | 2 | 2 | 6 | 4 | 4 | 4 | 4 |
| 6 | 4 | 4 | 7 | 6 | 6 | 6 | 6 |
| 8 | 5 | 6 | 8 | 8 | 8 | 8 | 8 |
| 10 | 7 | 9 | 9 | 9 | 9 | 10 | 10 |
| 12 | 10 | 10 | 10 | 10 | 10 | — | — |

Comparative Stabilizers
(1) Dibutyltin bis(isooctyl thioglycolate) (18.0% Sn)
(2) Mixture of mono- and dibutyl(isooctyl thioglycolates) (12.5% Sn)
(3) Mixture of mono- and dimethyltin(isooctyl thioglycolates) (20% Sn)
(4) Monomethyltin tris(isooctyl thioglycolate) (10.5% Sn)
(5) Mixture of mono- and dibutyltin(isooctyl thioglycolates) (16% Sn).

Table II

| Stabilizer Components (%) | Example No. 1A | Example No. 1B | Comp. Ex. A |
|---|---|---|---|
| Dibutyltin sulfide | 7.8 | 7.0 | — |
| Beta mercaptoethanol | 6.3 | 6.0 | — |
| Monobutyltin tris(dodecyl mercaptide) | 47.6 | 43.0 | — |
| Butyl oleate | 38.3 | 44.0 | — |
| Dibutyltin bis(isooctyl thioglycolate) | — | — | 100 |
| Brabender Fusion and Degradation Tests | | | |
| Fusion | | | |
| Time (Min.) | 1.2 | 1.3 | 1.3 |
| Torque (m.-gms.) | 3350 | 3400 | 3500 |
| Temp. (° C.) | 183 | 183 | 183 |
| Equilibrium | | | |
| Torque (m.-gms.) | 2150 | 2200 | 2400 |
| Temp. (° C.) | 204 | 204 | 205 |
| Degradation Time (Minutes after fusion) | 9.1 | 9.0 | 8.9 |

EXAMPLE 2

Twin-screw pipe compositions were prepared by mixing the following materials together in a Henschel mixer at 3000 rpm at a temperature between 65° C. and 87.5° C. until a uniform composition was obtained:

| | Parts |
|---|---|
| Polyvinyl chloride (Tenneco 225) | 100 |
| Titanium Dioxide | 1.00 |
| Paraffin Wax | 1.25 |
| Acrylic Resin (Tenneco Supercryl 100) | 1.20 |
| Calcium Stearate | 0.35 |
| Stabilizer | 0.40 |

The properties of the compositions were determined by the procedures described in Examples 1.

The stabilizers used and the properties of the stabilized compositions are set forth in Table III.

Table III

| Stabilizer Components (%) | Example No. 2A | Example No. 2B | Comp. Ex. F |
|---|---|---|---|
| Dibutyltin sulfide | 7.8 | 7.0 | — |
| Beta mercaptoethanol | 6.3 | 6.0 | — |
| Monobutyltin tris(dodecyl mercaptide) | 47.6 | 43.0 | — |
| Butyl oleate | 38.3 | 44.0 | — |
| Dibutyltin bis(isooctyl thioglycolate) | — | — | 80 |
| Monobutyltin bis(isooctyl thioglycolate) | — | — | 20 |
| Dynamic Brabender Heat Stability (color after indicated time at 178° C.) | | | |
| 1 Min. | 1 | 1 | 1 |
| 2 | 1 | 1 | 2 |
| 3 | 1 | 2 | 3 |
| 4 | 2 | 2 | 4 |
| 6 | 3 | 3 | 5 |
| 8 | 4 | 4 | 6 |
| 10 | 5 | 5 | 7 |
| 12 | 5 | 6 | 8 |
| 14 | 7 | 7 | 8 |
| 16 | 7 | 7 | 9 |
| 18 | 8 | 8 | 10 |
| Brabender Fusion and Degradation Tests | | | |
| Fusion | | | |
| Time (Min.) | 2.4 | 2.4 | 2.7 |
| Torque (m.-gms.) | 3000 | 3050 | 3150 |
| Temp. (° C.) | 184 | 182 | 185 |
| Equilibrium | | | |
| Torque (m.-gms.) | 2000 | 2000 | 2100 |
| Temp. (° C.) | 197 | 196 | 192 |
| Degradation Time (Minutes after fusion) | 14.9 | 14.4 | 14.6 |

From the data in Tables I, II, and III, it will be seen that the stabilizer systems of this invention provided superior functional performance, that is, better early color and better color stability, to rigid polyvinyl chloride compositions, especially to pigmented polyvinyl chloride pipe compositions, over a wide range of temperatures than did the comparative stabilizers, all of which are used commercially in this type of composition.

What is claimed is:

1. A heat and light stable resinous composition comprising a vinyl halide resin and 0.2 to 5 percent by weight, based on the weight of the vinyl halide resin, of a stabilizer system that consists essentially of
   a. 15 percent to 75 percent by weight of an organotin mercaptide having the structural formula

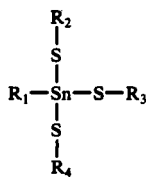

wherein $R_1$, $R_2$, $R_3$, and $R_4$ each represents an alkyl group having 1 to 18 carbon atoms or an alkenyl group having 2 to 18 carbon atoms;

b. 1 to 25 percent by weight of a mercaptoalcohol having from 2 to 20 carbon atoms and having the structural formula

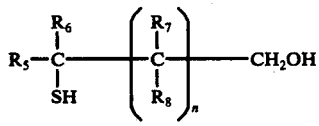

wherein $R_5$, $R_6$, $R_7$, and $R_8$ each represents hydrogen or an aryl, alkyl, alkenyl, or cycloalkyl group and $n$ is 0 or 1;

3 to 15 percent by weight of an organotin sulfide having the structural formula

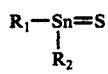

wherein $R_1$ and $R_2$ each represents an alkyl group having 1 to 18 carbon atoms or an alkenyl group having 2 to 18 carbon atoms; and d. 10 to 80 percent by weight of an inert organic diluent selected from the group consisting of hydrocarbons and alkyl esters of aliphatic monocarboxylic acids.

2. A heat and light stable resinous composition as defined in claim 1 wherein the vinyl halide resin is polyvinyl chloride.

3. A heat and light stable resinous composition as defined in claim 1 that contains from 0.3 to 3 percent by weight, based on the weight of the vinyl halide resin, of the stabilizer system.

4. A heat and light stable resinous composition as defined in claim 1 wherein the stabilizer system comprises a. 30 to 50 percent by weight of a monoorganotin tris(alkyl mercaptide);
b. 5 to 10 percent by weight of a mercaptoalcohol;
c. 5 to 10 percent by weight of an organotin sulfide; and
d. 30 to 50 percent by weight of an inert organic diluent.

5. A heat and light stable resinous composition as defined in claim 4 wherein the stabilizer system comprises a. 30 to 50 percent by weight of monobutyltin tris(dodecyl mercaptide);
b. 5 to 10 percent by weight of β-mercaptoethanol;
c. 5 to 10 percent by weight of dibutyltin sulfide; and d. 30 to 50 percent by weight of butyl oleate.

6. A stabilizer system for vinyl halide resin compositions that consists essentially of a. 15 to 75 percent by weight of a monoorganotin tris(alkyl mercaptide) having the structural formula

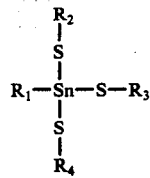

wherein $R_1$, $R_2$, $R_3$, and $R_4$ each represents an alkyl group having 1 to 18 carbon atoms or an alkenyl group having 2 to 18 carbon atoms;

b. 1 to 25 percent by weight of a mercaptoalcohol having from 2 to 20 carbon atoms and having the structural formula

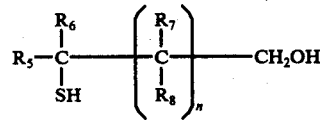

wherein $R_5$, $R_6$, $R_7$, and $R_8$ each represents hydrogen or an aryl, alkyl, alkenyl, or cycloalkyl group and $n$ is 0 or 1;

c. 3 to 15 percent by weight of an organotin sulfide having the structural formula

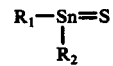

wherein $R_1$ and $R_2$ each represents an alkyl group having 1 to 18 carbon atoms or an alkenyl group having 2 to 18 carbon atoms; and d. 10 to 80 percent by weight of an inert organic diluent selected from the group consisting of hydrocarbons and alkyl esters of aliphatic monocarboxylic acids.

7. A stabilizer system for vinyl halide resin compositions as defined in claim 6 that consists essentially of a. 30 to 50 percent by weight of a monoorganotin tris(alkyl mercaptide);
b. 5 to 10 percent by weight of a mercaptoalcohol;
c. 5 to 10 percent by weight of an organotin sulfide; and
d. 30 to 50 percent by weight of an organic diluent.

8. A stabilizer system for vinyl halide resin compositions as defined in claim 6 wherein the monoorganotin tris(alkyl mercaptide) is monobutyltin tris(dodecyl mercaptide).

9. A stabilizer system for vinyl halide resin compositions as defined in claim 6 wherein the mercaptoalcohol is β-mercaptoethanol.

10. A stabilizer system for vinyl halide resin compositions as defined in claim 6 wherein the organotin sulfide is dibutyltin sulfide.

* * * * *

UNITED STATES PATENT AND TRADEMARK OFFICE
CERTIFICATE OF CORRECTION

PATENT NO. : 4,043,957
DATED : August 23, 1977
INVENTOR(S) : Emery Szabo

It is certified that error appears in the above—identified patent and that said Letters Patent are hereby corrected as shown below:

Column 2, line 46, change "mecaptoalcohol" to -- mercaptoalcohol --.

Column 3, line 56, change "ring" to -- bring --.

Column 7, line 26, before "3" insert -- c. --.

Signed and Sealed this

First Day of November 1977

[SEAL]

Attest:

RUTH C. MASON
Attesting Officer

LUTRELLE F. PARKER
Acting Commissioner of Patents and Trademarks